Feb. 2, 1943.   R. C. HOLTON   2,309,847
GO-DEVIL CULTIVATOR
Filed May 1, 1940   3 Sheets-Sheet 2

R. C. Holton
INVENTOR.
BY *Knowles*
ATTORNEYS.

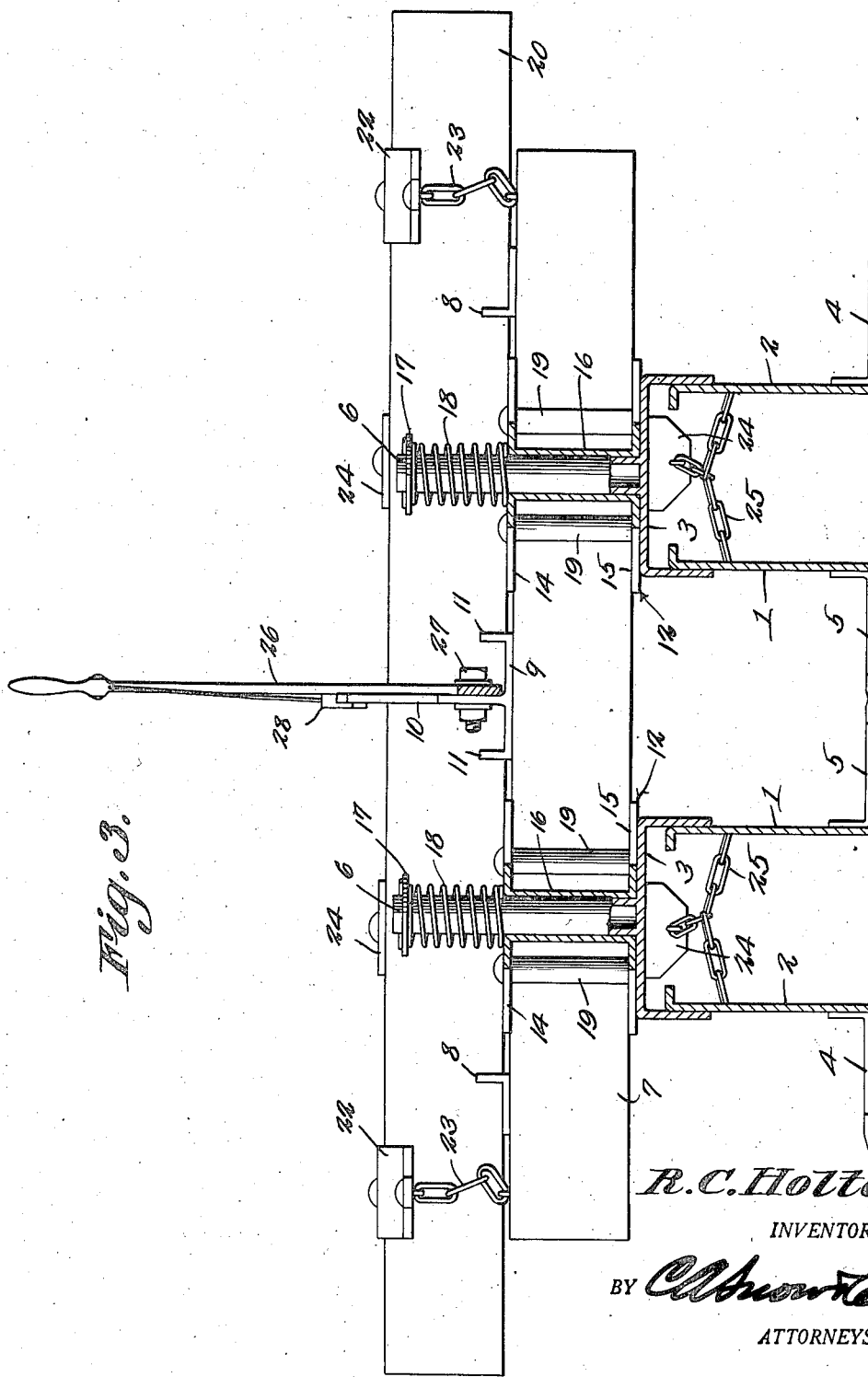

Patented Feb. 2, 1943

2,309,847

UNITED STATES PATENT OFFICE 2,309,847

GO-DEVIL CULTIVATOR

Richard C. Holton, Lubbock, Tex., assignor of one-half to Elmo Wall, Lubbock, Tex.

Application May 1, 1940, Serial No. 332,825

1 Claim. (Cl. 97—143)

The device forming the subject matter of this application is a cultivator of the sled type, novel means being provided whereby the cultivating instrumentalities will adjust themselves automatically, transversely of the draft line, to provide for different spaces between rows. Another object of the invention is to provide novel means whereby relative vertical movement, yieldably resisted, may take place between the frame portion of the machine and the sled portions thereof. Another object of the invention is to provide novel means for adjusting the soil-engaging elements relatively to the soil.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 3 is a transverse section on the line 3—3 of Fig. 1.

Figure 1:
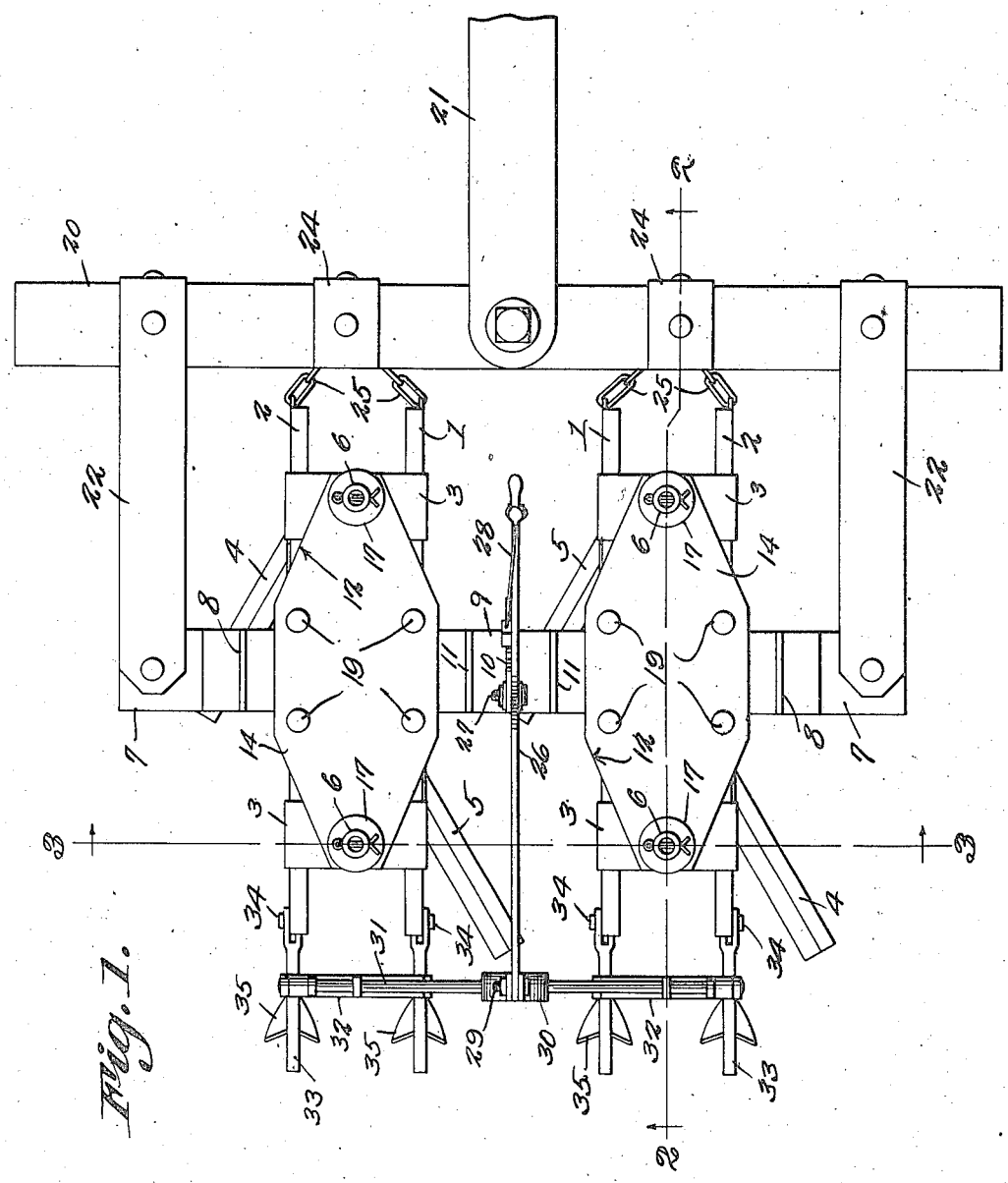
Fig. 1 shows in top plan, a device constructed in accordance with the invention.

The device forming the subject matter of this application may be made of metal throughout. It comprises pairs of parallel runners, extended lengthwise of the draft line. Each pair of runners includes an inner runner 1 and an outer runner 2. The runners 1 and 2 are rigidly connected by bridges 3, spaced apart longitudinally of the draft line. Substantially horizontal cultivators 4 are secured to the outer surfaces of the outer runners 2, and have an outward and rearward slant. Substantially horizontal cultivators 5 are secured to the inner surfaces of the inner runners 1 and have an inward and rearward slant. The cultivators 5 overlap a little, across the median longitudinal plane of the machine, so that there is a full sweep outwardly, to the outer edges of the cultivators 4. The bridges 3 are supplied intermediate their ends with upstanding posts 6.

The numeral 7 marks a main, hollow, transverse beam. On its upper surface, the beam 7 has pairs of upstanding stops 8. The stops 8 are disposed near the outer ends of the beam 7. A bracket 9 is secured on top of the beam 7, midway between the extremities thereof. The bracket 9 is provided intermediate its ends with a segment 10. The ends of the bracket 9 form upstanding inner stops 11, cooperating with the stops 8 in a way to be manifested hereinafter.

The main beam 7 passes through carriers 12 disposed lengthwise of the draft line. The carriers 12 comprise parallel upper plates 14 and lower plates 15, between which the main beam 7 is closely but slidably received, the construction being such that the carriers 12 can have limited movement transversely of the draft line and lengthwise of the main beam 7, between the stops 8—11. The upper plates 14 and the lower plates 15 of the carriers 12 are joined together, near their front and rear ends, by sleeves 16. The sleeves 16 are slidably mounted for vertical movement on the posts 6. There are removable abutments 17 on the upper ends of the posts 6. Compression springs 18 surround the posts 6, between the abutments 17 and the upper plates 14 of the carriers 12. The construction is such that relative vertical movement is possible between the beam 7 on the one hand, together with the carriers 12, and the soil-engaging runners 1 and 2 on the other hand. The upper plates 14 and the lower plates 15 of the carriers 12 are connected by securing elments 19. The securing elements 19 are located closely enough to the beam 7, on opposite sides of it, lengthwise of the draft line, so that the carriers 12 and the sleds comprising the runners 1 and 2, can have no appreciable movement lengthwise of the draft line.

The numeral 20 designates a hollow cross bar, located a little in front of the sled structure comprising the runners 1 and 2. Intermediate its ends, the cross bar 20 is connected to and supported by any appropriate traction means 21, such as the power-lifted draw bar shown in Patent 1,939,950, issued on December 19, 1933, to Theophilus Brown. Rearwardly extended arms 22 are secured to the bar 20, near the ends thereof. The rear ends of the arms 22 are connected to the end portions of the main beam 7 by chains 23. Depending anchors 24 are secured to the cross bar 20, inwardly of the arms 22. The anchors 24 are connected to the forward ends of the sled runners 1 and 2 by Y-chains 25.

It is not necessary that the soil-engaging elements at the rear of the sleds be raised and lowered by hand, but they may be manipulated in that way. Having that consideration in mind, an angular hand lever 26 is fulcrumed at 27 on the segment 10. The upright part of the lever 26 has a latch mechanism 28 adapted to cooperate with the segment 10. The rearwardly extended part of the lever 26 is pivoted at 29 to downwardly diverging links 30. In the lower ends of the links 30, a horizontal hanger rod 31 is mounted. The upper ends of suspension forks 32 are pivoted on the hanger rod 31. The lower ends of the forks 32 are pivoted to the intermediate portions of cultivator beams 33. The forward ends of the cultivator beams 33 are pivoted to the rear parts of the sled runners 1 and 2, as indicated at 34. The beams 33 carry soil-engaging elements 35, operating behind the sled runners 1 and 2.

Figure 2:
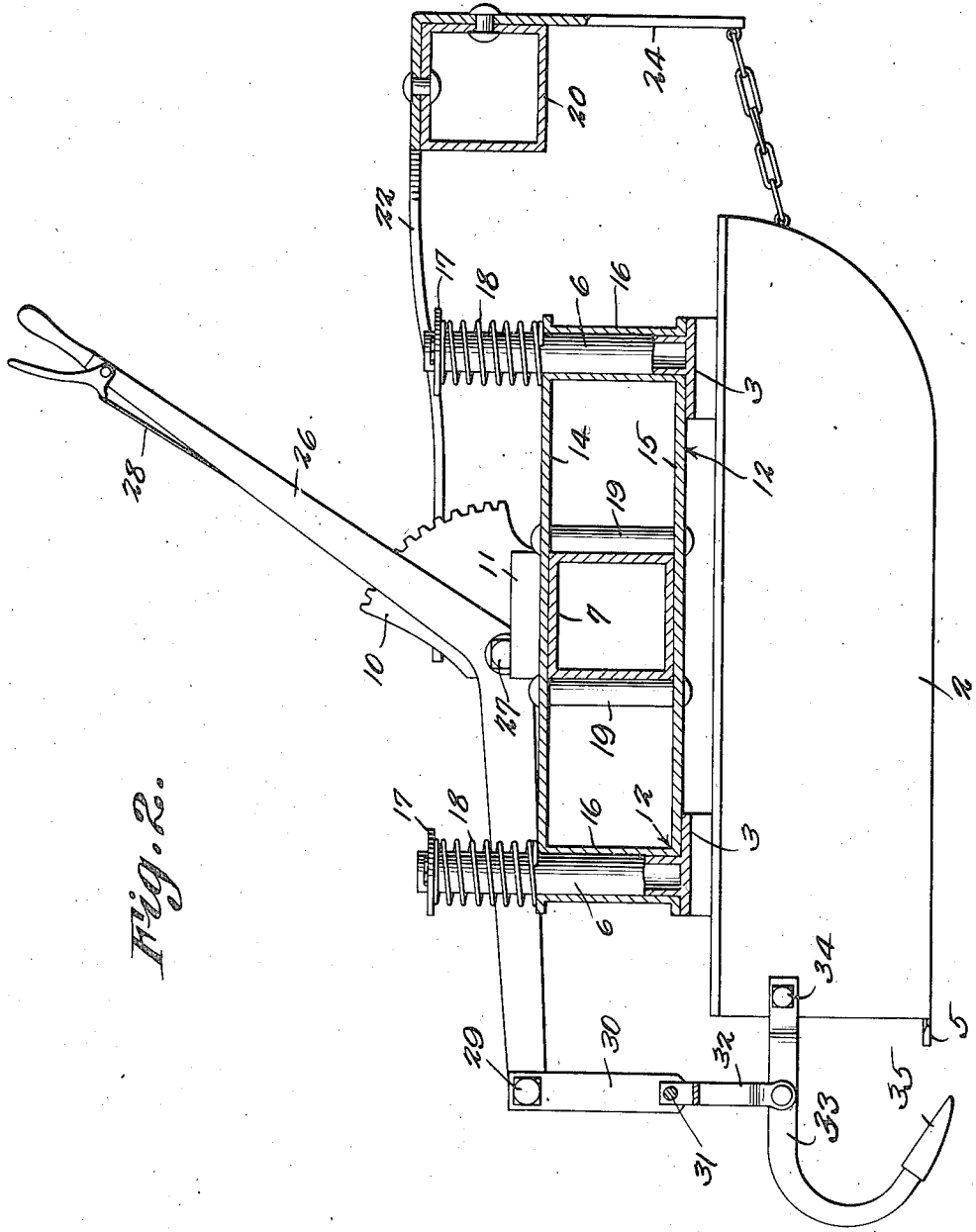
Fig. 2 is a longitudinal section on the line 2—2 of Fig. 1.

Owing to the fact that the carriers 12, to which the sled runners 1 and 2 are connected, are mounted to move on the main beam 7, between the stops 8—11, transversely of the draft line, the soil-engaging elements, such as the parts 4, 5 and 35, will work readily between differently spaced rows. Through the instrumentality of the lever 26 and associated parts, the soil-engaging elements 35 can be raised and lowered at the will of an operator, in a way which will be understood clearly when Fig. 2 of the drawings is noted.

The runners 1 and 2, and associated parts, will follow the irregularities in the ground, owing to the slidable relation between the posts 6 and the sleeves 16, and owing to the provision of the springs 18.

The specific structure hereinbefore described and delineated in the drawings forms a simple but effective means whereby the broader features of the invention may be embodied in a satisfactory form.

What is claimed is:

In an agricultural implement of the class described, a main beam, means for supporting the beam, carriers including upper and lower members between which the beam fits closely, securing elements connecting the upper and lower members to prevent movement of the carriers transversely of the beam, the carriers being slidable longitudinally of the beam, stops on the beam and limiting the sliding movement of the carriers longitudinally of the beam, sleds having vertical posts received slidably in the carriers and having their upper portions disposed above the upper members of the carriers, abutments on the posts, compression springs about the upper portions of the posts and interposed between the abutments and the upper members, soil-engaging elements assembled with the sleds for vertical movement, and means carried by the beam for raising and lowering the soil-engaging elements at the will of an operator.

RICHARD C. HOLTON.